July 24, 1962
NIRO AKAHANE
3,045,536
CAMERA MOTOR CONTROL
Filed Dec. 29, 1959
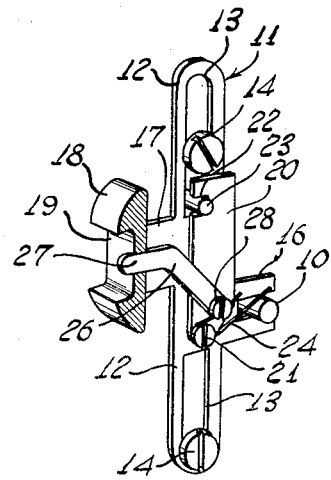
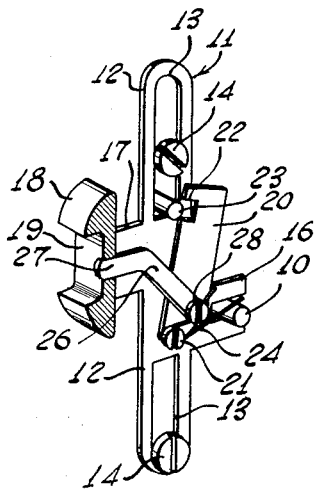
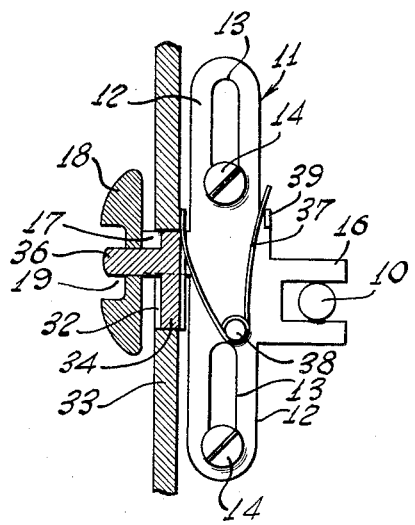
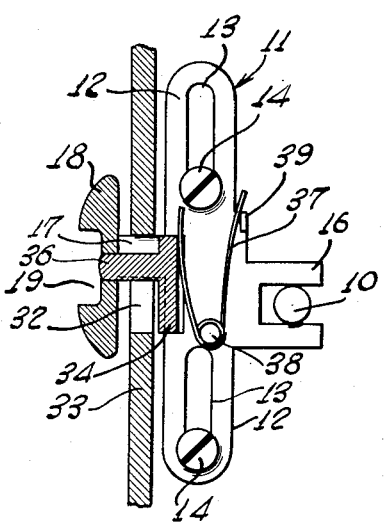
INVENTOR
NIRO AKAHANE
By *Stanley Walder*
ATTORNEY

United States Patent Office 3,045,536
Patented July 24, 1962

1

3,045,536
CAMERA MOTOR CONTROL
Niro Akahane, Suwa-gun, Nagano-ken, Japan, assignor to Yashica Co. Ltd., Tokyo, Japan, a corporation of Japan
Filed Dec. 29, 1959, Ser. No. 862,635
Claims priority, application Japan Jan. 16, 1959
3 Claims. (Cl. 88—16)

The present invention relates generally to improvements in motion picture cameras and it relates more particularly to an improved motor control device in a motion picture camera.

The conventional motion picture camera includes a spring wound motor or an electric motor which concurrently drives the camera shutter mechanism and the film frame advancing mechanism. In order to control the starting and stopping of the camera motor and hence the picture taking sequence there is provided a finger manipulative control button or knob which is externally mounted on the camera body. Where the camera employs as its motive power a spring wound motor the control button is coupled to a check member which normally locks the film frame advancing element in its retracted position and which may be moved to a release position by sliding the control button thereby permitting the driving of the shutter and film advance mechanism. On the other hand, where an electric motor is employed as the camera motivating means the control button actuates an electric switch connecting the motor to the battery power source. In both cases, the control button is normally resiliently urged to its stop position so upon release thereof the camera motion is stopped.

In order to facilitate the easy handling and operation of the motion picture camera the control button is generally located in a most accessible position so as to permit its ready manipulation by the operator when sighting through the camera viewing lens. However, by reason of the ready accessibility of the control button and its ease of operation, the accidental movement of the button to its start or release position is a frequent happening resulting in the waste of film. This accidental occurrence may attend the normal handling of the camera during the use or adjustment thereof, during the movement or carrying of the camera or under many other circumstances. If the control button were located in a position which would minimize the accidental movement thereof its ease of manipulation would be undesirably reduced.

It is thus a principal object of the present invention to provide an improved motion picture camera.

Another object of the present invention is to provide a motion picture camera provided with an improved picture taking control mechanism.

Still another object of the present invention is to provide an improved motion picture camera provided with a shutter release mechanism, the accidental actuation of which is substantially prevented.

A further object of the present invention is to provide an improved motion picture camera of the above nature characterized by simplicity, ruggedness, low cost and ease of operation.

The above and other objects of the present invention will become apparent from a reading of the following description taken in conjunction with the accompanying drawing, wherein:

FIGURE 1 is a perspective view partially in section,

2 of an improved film advance release mechanism embodying the present invention, illustrated in locked position;

FIGURE 2 is a view similar to FIGURE 1, the mechanism being illustrated in an unlocked position;

FIGURE 3 is a side elevational view partially in section, of another embodiment of the present invention illustrated in a locked position; and FIGURE 4 is a view similar to FIGURE 3, the mechanism being illustrated in an unlocked position.

In a sense the present invention contemplates the provision in a camera of the character described of a shutter control mechanism provided with a first manipulative element movable along a predetermined path between a motor check and a motor release position and resiliently urged to a motor check position and a latching member movable between position locking and unlocking said control mechanism in its motor check position and resiliently urged to its lock position and provided with a manipulative element movable therewith and in a direction at an angle to said predetermined path and located in the vicinity of said first manipulative element.

According to a preferred form of the present invention the shutter control mechanism includes a vertically slidable control member which engages the conventional shutter control element associated with the camera drive mechanism and movable by the control member between a motor check and release position. The slidable control member is spring urged to its upper check position and is provided with a forwardly directed leg terminating in a button disposed on the outer face, of the camera body and having a centrally located axially apertured well formed therein. A swingable latch arm is pivoted to the slidable control member and has a recess formed therein which is movable with the latch arm into and out of engagement with a stationary pin mounted on the camera body. The latch arm is spring urged into engagement with the pin to lock the control member in its check position and an actuating lever is eccentrically pivoted to the latch arm and is provided with a leg which projects into the button well. Thus, in order to release the shutter it is first necessary to push the lever leg registering with the button well inwardly and then depress the button. By reason of the two motions in different directions being required to release the shutter the accidental actuation thereof is highly unlikely. Moreover, because of the common location of the two manipulative elements, their control is easy and simple. In accordance with a modification of the improved mechanism the latching device is defined by a latching element spring urged into registry with a mating opening formed in the front wall of the camera body and provided with a forwardly directed leg projecting into the button well. By pushing the leg inwardly the latching member is moved out of registry with the wall opening permitting the sliding of the button and control member to a release position.

Referring now to the drawing and more particularly to FIGURES 1 and 2 thereof which illustrate a preferred embodiment of the present invention, the reference numeral 10 generally designates the conventional camera check element which is vertically movable and when in its lower position releases the shutter and film advancing mechanism permitting the operation of the camera and when in its normally spring urged upper position checks or stops the operation of the shutter, the film advancing mechanism and the drive motor. The association of the check element 10 with the camera operating mechanism whether of the electric or spring wound motor type is well known and requires no further explanation.

Located within the camera casing is a vertically slidable control member 11 which includes an elongated middle section 12 having formed therein upper and lower longitudinally extending aligned vertical slots 13. The control member 11 is slidably mounted on the camera body by means of a pair of screws 14 having pin shanks which register with the slots 13. Projecting rearwardly from the control member midsection 12 is a yoke member 16 which embraces the control element 10 effecting the concurrent vertical movement of the element 10 and member 11. A leg 17 projects forwardly from the midsection 12 through a vertical slot in the camera casing wall and carries at its front end a laterally offset manipulative member or control button 18 which is vertically slidable with the control member along the external face of the camera casing. Medially located in the front face of the button 18 is a recess or well 19 having an axial aperture or bore formed therein.

A latching arm 20 is pivoted at its lower end to the control member 11 by means of a screw pin 21 disposed below the arm 17 and directly above the lower slot 13. The arm 20 is swingable in the plane of the control member 11 and has a recess 22 formed in an edge thereof which releasably engages a stationary pin 23 mounted on the camera body and registering with the upper slot 13 when the control member 11 is in its raised position and the latch arm 20 is in its counterclockwise position. A hairpin spring 24 is mounted on the screw 21 and includes a first arm bearing on the upper surface of the element 10 and a second arm bearing on an edge of the latch arm 20 to resiliently urge the latter in a counterclockwise direction.

An angulated control lever includes a forwardly upwardly inclined leg 26 and a forwardly directed substantially horizontal leg 27, the leg 27 normally projecting through the aperture in the well 19 to substantially the plane of the front surface of the button 18. The lower trailing end of the inclined leg 26 is pivoted to the latch arm 20 by a screw pin 28 at a point eccentric to the screw 21.

In the camera inoperative or check condition the control element 10, the control member 11, and the button 18 are in their upper raised positions as illustrated in FIGURE 1 of the drawing, the assembly being resiliently urged to such position by a spring, not shown, acting on the member 11. The member 11 is locked in its raised position by the latch member 20 which is releasably maintained in engagement with the pin 23 by the spring 24. In order to initiate the camera operation, the lever leg 27 is finger pushed rearwardly swinging the latch arm 20 clockwise out of engagement with the pin 23 to release the control member 11. The button 18 is then depressed, lowering the control member 11 and control element 10 to release the shutter and film advance mechanism and effect the running of the drive motor and operation of the camera. To stop the camera, the button 18 is merely released, allowing the control member 11 and element 10 to be spring returned to its upper position, in which position the latch arm 20 is urged by the spring 24 into locking engagement with the pin 23, and the lever leg 27 is returned to its forward position. It is apparent from the above that the operation of the camera may be simply effected by single finger manipulation since the lever leg 27 may be readily pushed and the button 18 depressed by one finger. Moreover, the inadvertent operation of the camera is highly improbable by reason of the dual sequential motion required to start the camera.

The embodiment of the present invention illustrated in FIGURES 3 and 4 of the drawing differs from that first described only in the control member latching arrangement. Specifically, as in the earlier embodiment, the control system includes the vertically slidable control member provided with a rearwardly directed yoke 16 embracing the control element 10 and a forwardly directed leg 17 projecting through a slot 32 formed in the camera casing wall 33 to the outside of the camera casing. The control button 18 is mounted on the free end of the leg 17 and has a well 19 located in its front face and provided with an axial aperture.

The latching mechanism includes a latch element or plate 34 which normally matingly registers with the slot 32 and is rearwardly slidable out of engagement therewith. A push rod 36 projects forwardly from the plate 34 and slidably registers with the well aperture, the leading end of the rod 36 being substantially in the plane of the front face of the button 18 when the plate 34 engages the opening 32. A hairpin spring 37 is mounted on the control member 11 by means of a pin 38 and includes a first leg bearing against an abutment 39 located on the control member 11 and a second leg bearing upon the rear face of the latch plate 34 to resiliently urge it forwardly.

In its check position the control member 11 is spring raised as illustrated in FIGURE 3 of the drawing and is releasably locked in check position by the latch plate 34 being maintained in mating engagement with the slot 32 by the spring 37. The camera may be operated by pushing the plate 34 out of engagement with the slot 32 by finger pressing the rod 36 and then depressing the button 18 and the coupled member 11 and element 10. Upon release of the button 18 the member 11 is spring raised and the plate 34 returned into latching engagement with the slot 32 by the spring 37.

While there have been described and illustrated preferred embodiments of the present invention it is apparent that numerous alterations, omissions and additions within the scope of the claims may be made without departing from the spirit thereof.

What is claimed is:

1. In a motion picture camera including a drive motor and a control element movable between a motor stop and a motor go position, a control member coupled to said control element and vertically movable between a stop and go position, a button having an axial aperture formed therein located exterior of said camera and connected to said control member and movable therewith along a vertical path, means releasably latching said control member in its stop position, and a second transversely movable manipulative member actuating said latching means and including a leg slidably registering with said axial aperture.

2. In a motion picture camera including a drive motor and a control element movable between a motor stop and a motor go position, a control member connected to said control element and longitudinally slidable between a stop and go position and including a forwardly directed leg, a first manipulative member located exterior of said camera and mounted on the leading end of said leg, means releasably latching said control member in its stop position and including a latch arm pivoted to said control member and having a recess formed therein and a relatively stationary pin releasably engaged by said recess, and a second manipulative member transversely movable in the vicinity of said first manipulative member and connected to said latch arm by a lever eccentrically pivoted to said latch arm.

3. In a motion picture camera including a drive motor and a control element movable between a motor stop and a motor go position, a control member connected to said control element and longitudinally slidable between a stop and go position and including a forwardly directed leg projecting through a wall of said camera, said camera wall having a latch aperture formed therein, a first manipulative member located exterior of said camera and mounted on the free end of said leg, means releasably latching said control member in its stop position and including a latch element longitudinally movable with said control member and transversely movable into and out of engagement with said latch aperture and spring urged into engagement therewith, and a second manipulative member actuating said latching means and defined by a push rod projecting forwardly of said latch element into the vicinity of said first manipulative member.

References Cited in the file of this patent

UNITED STATES PATENTS

| | | |
|---|---|---|
| 2,711,117 | Favre | June 21, 1955 |
| 2,943,532 | Hashimoto | July 5, 1960 |
| 2,986,067 | Gopfert et al. | May 30, 1961 |

FOREIGN PATENTS

| | | |
|---|---|---|
| 598,967 | Great Britain | Mar. 2, 1948 |